US007792867B2

(12) United States Patent
Suga

(10) Patent No.: US 7,792,867 B2
(45) Date of Patent: Sep. 7, 2010

(54) INFORMATION PROCESSING METHOD AND INFORMATION PROCESSING APPARATUS

(75) Inventor: Yuji Suga, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 1497 days.

(21) Appl. No.: 11/142,734

(22) Filed: Jun. 2, 2005

(65) Prior Publication Data

US 2006/0015514 A1    Jan. 19, 2006

(30) Foreign Application Priority Data

Jun. 3, 2004   (JP)   ............................. 2004-166144
May 24, 2005  (JP)   ............................. 2005-151614

(51) Int. Cl.
*G06F 17/30* (2006.01)
(52) U.S. Cl. ............................... 707/798; 707/E17.011
(58) Field of Classification Search ................ 707/609, 707/705, 798, 802, E17.011
See application file for complete search history.

(56) References Cited

U.S. PATENT DOCUMENTS

| 5,586,314 | A  | * | 12/1996 | Hill et al. ........................ 707/4 |
| 5,841,381 | A  |   | 11/1998 | Nakayama .................... 341/67 |
| 6,237,006 | B1 | * | 5/2001  | Weinberg et al. ....... 707/103 R |
| 6,381,739 | B1 | * | 4/2002  | Breternitz et al. ............. 714/37 |
| 6,480,857 | B1 | * | 11/2002 | Chandler ........................... 1/1 |
| 6,535,869 | B1 | * | 3/2003  | Housel, III ..................... 707/2 |
| 6,751,622 | B1 | * | 6/2004  | Puri et al. ........................... 1/1 |
| 7,305,419 | B1 | * | 12/2007 | Cosby et al. ................. 707/200 |
| 2003/0076958 | A1 | * | 4/2003 | Ishiguro et al. ............. 380/277 |
| 2003/0190042 | A1 |   | 10/2003 | Tagashira et al. ............. 380/45 |
| 2005/0141706 | A1 | * | 6/2005 | Regli et al. .................... 380/44 |
| 2005/0182774 | A1 | * | 8/2005 | Weir et al. ................... 707/100 |
| 2006/0069964 | A1 |   | 3/2006 | Hayashi et al. ............... 714/52 |
| 2006/0161557 | A1 | * | 7/2006 | Dettinger et al. ............ 707/100 |

FOREIGN PATENT DOCUMENTS

EP         127136 A2 *  1/2003
JP         2000-102005    4/2000

OTHER PUBLICATIONS

Dan C. Clarke, An Augmented Directed Graph Base for Application Development, 1982 ACM, pp. 155-159.*
Lin, Chu-Hsing, "Dynamic Key Management Schemes for Access Control in a Hierarchy", Computer Communications, vol. 20, No. 15, pp. 1381-1385, 1997.
Birget et al., Jean-Camille, "Hierarchy-Based Access Control in Distributed Environments", Prov of IEEE International Conference on Communication, IEEE vol. 1, pp. 229-233, Jun. 2001.
T. Nakano, et al., "Digital Content Protection Management Scheme", SCIS2001, The 2001 Symposium on Cryptography and Information Security, Cisco, Japan, Jan. 23-26, 2001, The Institute of Electronics, Information and Communication Engineers, pp. 213-218.

* cited by examiner

*Primary Examiner*—Fred I Ehichioya
(74) *Attorney, Agent, or Firm*—Fitzpatrick, Cella, Harper & Scinto

(57) ABSTRACT

Data of a directed graph is input (S2001), and is divided into subgraphs (S2002). Data of node key assignment tables are generated for respective divided subgraphs (step S2003). The respective node key assignment tables are merged (S2004).

3 Claims, 17 Drawing Sheets

F I G. 6
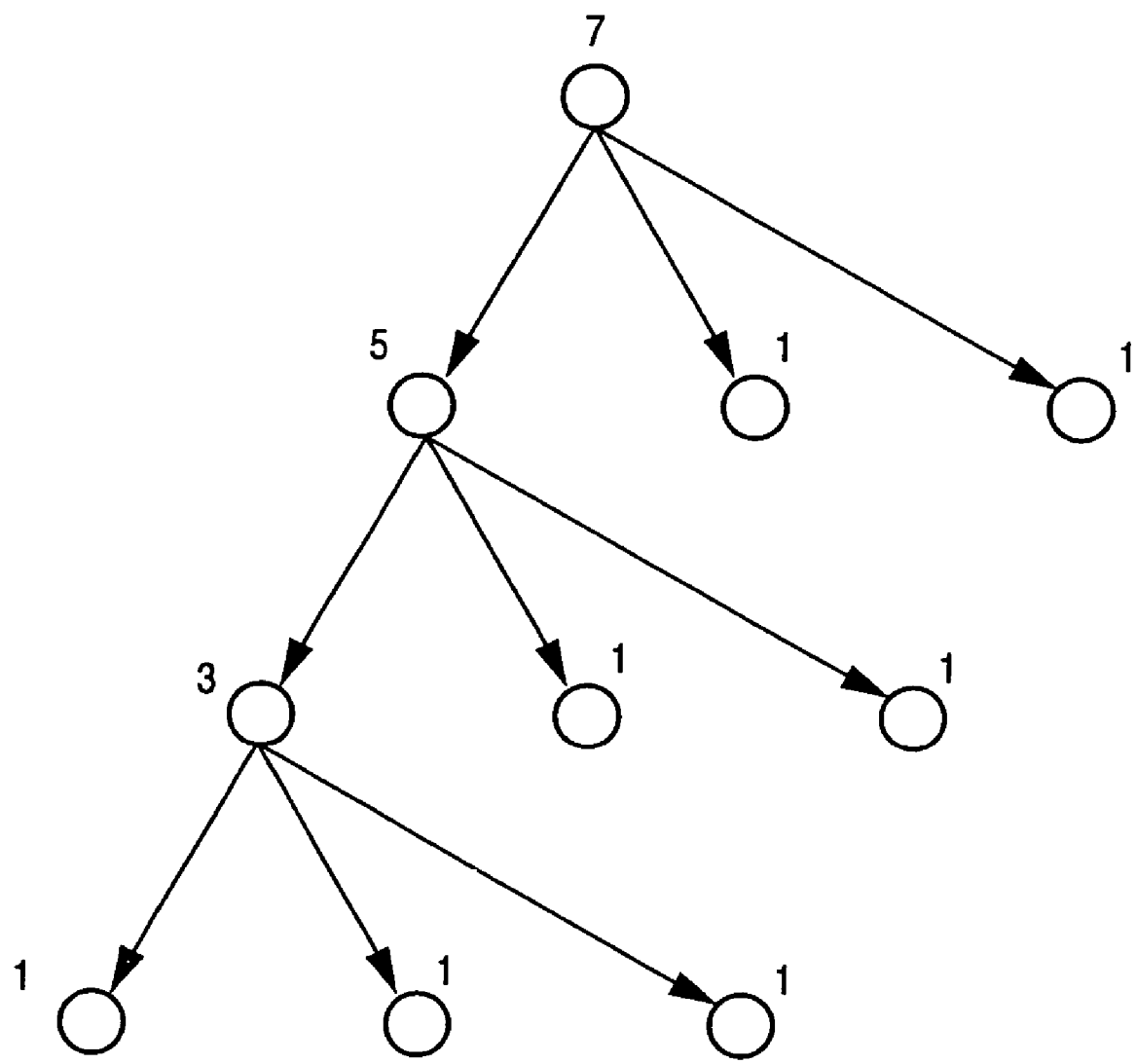

INFORMATION PROCESSING METHOD AND INFORMATION PROCESSING APPARATUS

FIELD OF THE INVENTION

The present invention relates to a key management technique.

BACKGROUND OF THE INVENTION

In recent years, opportunities of distributing digital contents such as documents, image data, and the like via communication lines and large-size recording media such as DVDs and the like are increasing. A digital content delivery service delivers contents to specific users, and is required to have a scheme for preventing contents from leaking except for these users. In content delivery via large-size media, the use of a similar access control mechanism of users has been examined. In this case, encryption, a scramble process, and the like are applied to content data, and a mechanism that allows only authorized users who have authorized key information or know a descramble process to perform a decryption process and to enjoy qualified contents such as documents, image data, and the like is provided.

In such content delivery service, there are content providers who deliver contents. In each content provider, assume that different kinds of access control information must be set for a plurality of contents, and encryption processes using different keys are applied to respective contents, users, user actions (e.g., browse, copy, and the like). In such process, management associated with key information such as key generation, key storage, key delivery, and the like often imposes a heavy load on the content provider. Hence, studies associated with more efficient key management schemes without any security level drop have been made. Some conventional management schemes will be explained below.

<Tree Structure Management Scheme>

The tree structure management scheme is used in an offline content player such as a DVD player or the like, and is suited to invalidate users. In this scheme, key information used in encryption, and an encrypted content are simultaneously delivered or are stored in a medium so that only authorized users can decrypt encrypted data. Key information must be distributed to each user in an appropriate combination, and a huge number of user key information can be efficiently managed by mapping users to a tree structure.

This management scheme has the following three indices upon determining the trade-off of the scheme: 1) the data size of key information to be delivered simultaneously with a content; 2) the data size of key information distributed in advance to each user; and 3) the data size of key information that must be managed by the content provider. An online delivery service attaches importance to 1) that has an influence on the network traffic, but a content provider places top priority on management cost of 3). Note that the weights of the indices vary depending on situations in this way.

As a representative tree structure management scheme, a content delivery model is known (e.g., see "Digital Content Protection Management Scheme" SCIS2001, pp. 213-218). This model uses a tree structure for key derivation, as shown in FIG. 11, and different keys are set in respective nodes (indicated by circles in FIG. 11). Assume that a user key (assume a key held by a player such as a DVD player or the like in the above reference) amounts to an end node (leaf node), and all key data from a root node to an end node are held. This model assumes frequent occurrence of update processes, and the efficiency of key invalidation is improved by this layout.

<Hierarchical Key Management Scheme>

On the other hand, in key management assumed by the hierarchical key management scheme, keys are set in respective nodes as in the above scheme, but keys located at all nodes including the root are distributed to the user (e.g., see C. H. Lin, "Dynamic key management schemes for access control in a hierarchy" Computer Communications, 20:1381-1385, 1997, and J. -C. Birget, X. Zou, G, Noubir, B. Ramamurthy, "Hierarchy-Based Access Control In Distributed Environments" in the Proceedings of IEEE ICC, June 2001).

An access structure shown in FIGS. 12 and 13 is assumed in place of an n-ary tree structure shown in FIG. 11, and locally has a relationship, as shown in FIG. 14. In this case, a structure that can generate a key to be possessed by node n3 from each key in nodes n1 and n2 must be provided separately. According to the reference of Birget et. al. (J. -C. Birget, X. Zou, G, Noubir, B. Ramamurthy, "Hierarchy-Based Access Control In Distributed Environments" in the Proceedings of IEEE ICC, June 2001), the following two schemes are proposed as the scheme for providing this structure.

(1) User Multiple Keying

In this scheme, each node holds a plurality of keys, and a parent node holds all keys of child nodes. FIG. 15 shows an example of the tree structure of this scheme. FIG. 15 shows a set of key data distributed to respective nodes. For example, as can be seen from FIG. 15, a parent node of a node to which {k5} is distributed includes key data k5. Likewise, a parent node includes all key data of child nodes.

(2) One-Way Function Based Keying Schemes

This scheme is designed by expanding the proposal of Lin et. al (C. H. Lin, "Dynamic key management schemes for access control in a hierarchy" Computer Communications, 20:1381-1385, 1997), and can reduce the number of pieces of key information to be held by respective nodes using a one-way hash function. However, in order to generate key data of a child node based on those of a plurality of parent nodes, as shown in FIG. 14, the following manipulation is required. This manipulation will be explained below using FIG. 16. FIG. 16 is a view for explaining a process for generating key data of a child node in the One-way function based keying schemes. In FIG. 16, in order to generate k3 from key data k1 or k2, the following arithmetic operations are made:

$$k3 := F(k1, n3) \text{ XOR } r13$$

$$k3 := F(k2, n3) \text{ XOR } r23$$

where XOR is an exclusive OR of each bit. F( ) is a one-way hash function, which will be described in detail later. n3 is an identifier of a node associated with key data k3, and r13 and r23 are respectively random data associated by node n1 (key data k1) and node n3, and that associated by node n2 (key data k2) and node n3. Both these random data are open to the public.

The function F( ) is configured by $F(k\_i, n\_j) = g^{\{k\_i + n\_j\}} \mod p$ (where p is a prime number, and g is a primitive element), and r13 and r23 above are generated to satisfy $F(k1, n3) \text{ XOR } r13 = F(k2, n3) \text{ XOR } r23$.

<Multiple Digest Key Derivation Method>

In 1) User multiple keying of the aforementioned hierarchical key management schemes, respective nodes must have many keys, and the depth of key data to be held increases in proportion to the total number of nodes as the number of layers increases. In 2) One-way function based keying schemes, the key data size to be held by respective nodes is reduced using the one-way hash function. However, public random data such as r13, r23, and the like must be separately held, and the number of data to be held increases as the number of layers increases as in 1).

Furthermore, in 2), the one-way hash function uses exponential operations. The configuration using a trap-door hash function may be used. However, in either case, arithmetic operations that require exponential operations are included, and the calculation cost is huge. Especially, in a device with small arithmetic resources such as a PDA or the like, key calculations require much time and, as a result, interactive processes may be disturbed upon data decryption. A key derivation scheme which can solve these problems and has a similar access structure with a smaller calculation volume is the multiple digest key derivation method.

<Overview of Key Generation>

Generation of node keys of respective nodes in the multiple digest key derivation method is as follows. Assume that an access structure which is to undergo key management is expressed by a directed graph in which the hierarchical relationship has neither loops nor cycles, as shown in FIG. 2. FIG. 2 shows the access structure in the multiple digest key derivation method.

<Division of Nodes>

In order to generate key data, nodes are divided in given key derivation graph G to satisfy the following conditions. Note that the following notation is used: Node(G) is a set of all nodes, N is the number of subsets, and SubG_1, SubG_2, . . . , SubG_N are divided subsets.

SubG_1 ∪ SubG_2 ∪ . . . ∪ SubG_N=Node(G), i.e., all subsets cover all nodes.
  Two arbitrary, different nodes n_a and n_b included in SubG_i satisfy n_a<n_b or n_a>n_b. That is, n_a and n_b have a descendant relationship: one node is inevitably a descendant of the other node.

The number N of divided subsets is called a key derivation order of key derivation graph G, which is represented by Ord(G).

<Node Key Assignment>

One initial key K_1 is calculated for each subset SubG_i, and is assigned as a node key of a root node. To descendant nodes under the root node, node keys are assigned using the following rules.

1) Respective nodes are given numbers associated with N initial keys K_i (1≦i≦N). This number indicates the number of times of execution of the one-way function to each initial key K_i, and "N" that means "none" may be given. If the number of initial key K_i is "N", this means that a node does not possess any key associated with initial key K_i.

2) Nodes included in each SubG_i are sorted in each set in descending order in accordance with the descendant relationship on the directed graph, and numbers which are incremented by 1 in turn from zero are assigned. This number is associated with initial key K_i.

3) The number associated with initial key K_j (i≠j) of a node included in SubG_i is set to be N (none) if that node is not an ancestor node of a node included in SubG_j (as a subset for initial key K_j), and the number of a node as the ancestor node is set to be the minimum value of numbers assigned to nodes included in SubG_j as descendant nodes.

FIG. 4 is a flowchart of the node key assignment process. Assume that a set of all nodes have already been divided into subsets {SubG_i} (1≦i≦N) which are relatively prime and are not empty, and initial keys K_i for these subsets have been calculated. Let #N(i) be the number of nodes included in subset SubG_i. Also, nodes included in subset SubG_i are sorted in descending order according to the descendant relationship on the directed graph, and are described by SubG_i={n(i, 1), n(i, 2), . . . , n(i, #N(i))}. A node key for node (i, j) is generated by applying the one-way hash function to initial key K_k (1≦k≦N) a prescribed number of times, which is represented by h(i, j, k).

Step S1101 is a loop of variable i which varies from 1 to N, step S1102 is a loop of variable j which varies from 1 to N, and step S1103 is a loop of variable k which varies from 1 to N. It is evaluated in step S1104 if variable i is equal to variable k. If the two variables are equal to each other, the flow advances to step S1105; otherwise, the flow advances to step S1106. In step S1105, "j−1" is substituted in h(i, j, k), and the flow returns to the loop process.

It is evaluated in step S1106 if m which satisfies n(k, m)<n(i, j), i.e., that n(i, j) is an ancestor node of n(k, m) exists. If no m exists, the flow advances to step S1107; otherwise, the flow advances to step S1108. In step S1107, "N" is substituted in h(i, j, k), and the flow returns to the loop process.

In step S1108, min{h(k, m, k)|n(k, m)<n(i, j)}, i.e., a minimum value of h(k, m, k) of nodes n(k, m) whose ancestor node is n(i, j), is substituted in h(i, j, k), and the flow returns to the loop process.

This key generation scheme is configured to satisfy the following two requirements.

Generability: A target node can generate a key of its grandchild node.
  Collusion attack avoidability: Even when entities located at two or more arbitrary nodes collude, a key of an ancestor node located at a higher level than each node cannot be generated (unless the one-way function is vulnerable to such attack).

Under these conditions, the hierarchical key management scheme that can securely perform key generation and key derivation can be implemented. For example, node keys shown in FIG. 3 are generated for the directed graph shown in FIG. 2. FIG. 3 shows node keys for the directed graph in FIG. 2 when the hierarchical key management scheme is applied.

A vector of each node in FIG. 3 expresses the number of times of the hash function to be applied to three initial keys x, y, and z. For example, a cell with a description [2, 2, N] holds H(H(x)) and H(H(y)) as node keys. N means "none", i.e., no information associated with initial key z. When a hash operation is applied n times in the following description, such process is abbreviated to H^n( ). Based on this notation, a cell with a description [2, 2, N] has two node keys H^2(x) and H^2(y).

<Key Derivation>

A key derivation method to respective nodes by a root key deriver (entity of a root node) and a key derivation method to lower nodes by entities which hold individual keys other than the root key deriver will be explained respectively. The root key deriver randomly and securely generates parameters {x_i} (1≦i≦Ord(G)) as many as key derivation order Ord(G) which is determined according to key derivation graph G, and holds them as individual keys of itself. Furthermore, a plurality of keys are set in respective nodes by the aforementioned key generation sequence. The root key deriver securely distributes keys of respective nodes to entities located at respective nodes. Also, the root key deriver discloses a key derivation graph, and distributes data that can identify the relationship between the distributed keys and their positions on the graph to the entities.

The multiple digest key derivation method can derive a key derivation method to the access structure expressed by an arbitrary directed graph, but the size of each node key depends on the directed graph. More specifically, as is known, the maximum value of a node set having no hierarchical relationship (such set is called an "isolated creek") matches the size of a node key of a root node.

This means that the communication size required for key derivation becomes inefficient depending on the structure of the directed graph. The directed graph shown in FIG. 5 is such an example. FIG. 5 shows an example of the directed graph in which the maximum value of a node set having no hierarchical relationship matches the size of a node key of a root node.

Since seven nodes n_4 to n_7 of 10 nodes n_i ($1 \leq i \leq 10$) form a node set (=isolated creek) having no hierarchical relationship, a root node must hold seven initial keys. On the other hand, as can be locally seen from a subgraph formed by four nodes n_1, n_2, n_5, and n_6, different keys (a total of three keys) can be distributed from n_1 to n_2, n_5, and n_6, and node keys of descendant nodes suffice to be generated from the node key of n_2. With these examinations, an algorithm that holds seven initial keys is inefficient.

SUMMARY OF THE INVENTION

The present invention has been made in consideration of the aforementioned problems, and has as its object to securely configure a key management scheme which has an access structure in which the size of a node key to be held is reduced.

In order to achieve an object of the present invention, for example, an information processing method of the present invention comprises the following arrangement.

That is, an information processing method for performing key derivation by generating keys of respective nodes from a parent node on the basis of a hierarchical relationship expressed by a directed graph having no cycles, comprising: a generation step of generating an initial key at a root node located at an uppermost position; and a node key generation step of generating, when a predetermined node has N child nodes, N different node keys, which cannot be generated from each other, using a one-way function on the basis of a key of the predetermined node.

In order to achieve an object of the present invention, for example, an information processing method of the present invention comprises the following arrangement.

That is, an information processing method for generating keys of respective nodes from a parent node on the basis of a hierarchical relationship expressed by a directed graph having no cycles, comprising: a directed graph input step of inputting data of the directed graph; a directed graph division processing step of dividing the input data of the directed graph into subgraphs; a subgraph node key generation step of generating data of node key assignment tables for respective subgraphs divided in the directed graph division processing step; and a node key assignment table generation step of merging data of the node key assignment tables for the respective subgraphs.

In order to achieve an object of the present invention, for example, an information processing apparatus of the present invention comprises the following arrangement.

That is, an information processing apparatus for performing key derivation by generating keys of respective nodes from a parent node on the basis of a hierarchical relationship expressed by a directed graph having no cycles, comprising: generation means for generating an initial key at a root node located at an uppermost position; and node key generation means for, when a predetermined node has N child nodes, generating N different node keys, which cannot be generated from each other, using a one-way function on the basis of a key of the predetermined node.

In order to achieve an object of the present invention, for example, an information processing apparatus of the present invention comprises the following arrangement.

That is, an information processing apparatus for executing a process for generating keys of respective nodes from a parent node on the basis of a hierarchical relationship expressed by a directed graph having no cycles, comprising: directed graph input means for inputting data of the directed graph; directed graph division processing means for dividing the input data of the directed graph into subgraphs; subgraph node key generation means for generating data of node key assignment tables for respective subgraphs divided by the directed graph division processing means; and node key assignment table generation means for merging data of the node key assignment tables for the respective subgraphs.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 6 shows the numbers of node keys of respective nodes obtained by algorithm Γ(G);

DETAILED DESCRIPTION OF THE PREFERRED EMBODIMENTS

Preferred embodiments of the present invention will now be described in detail in accordance with the accompanying drawings.

Figure 1:
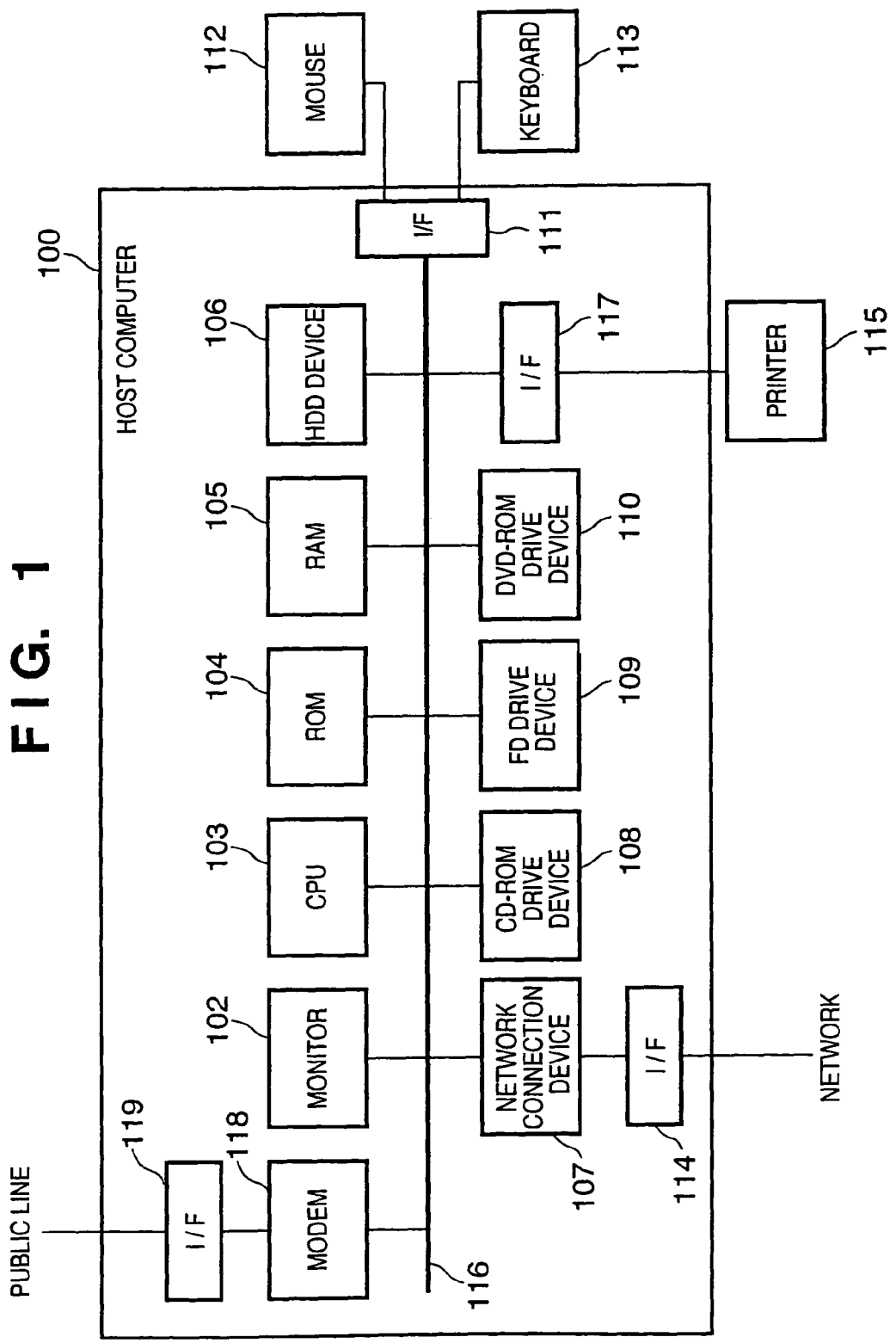
FIG. 1 is a block diagram showing the basic arrangement of a computer system which serves as an information processing apparatus according to an embodiment of the present invention.
Figure 2:
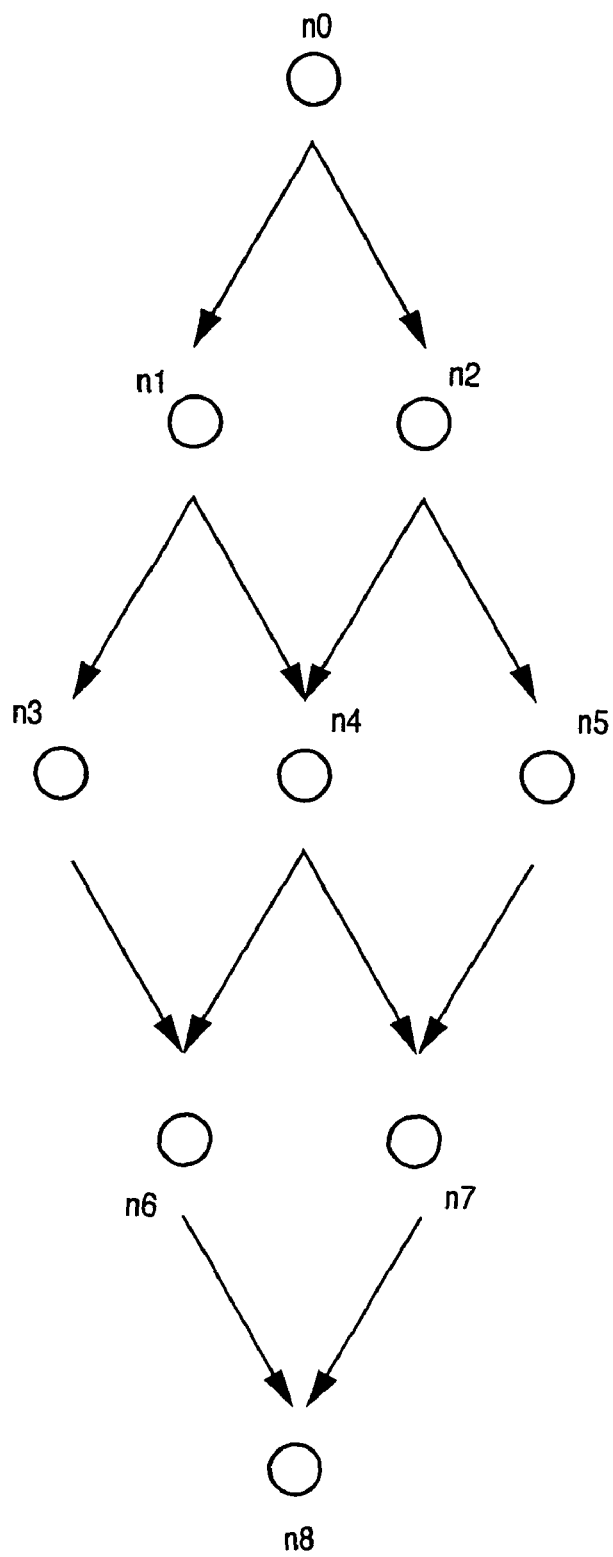
FIG. 2 shows an access structure in a hash key management scheme.
Figure 3:
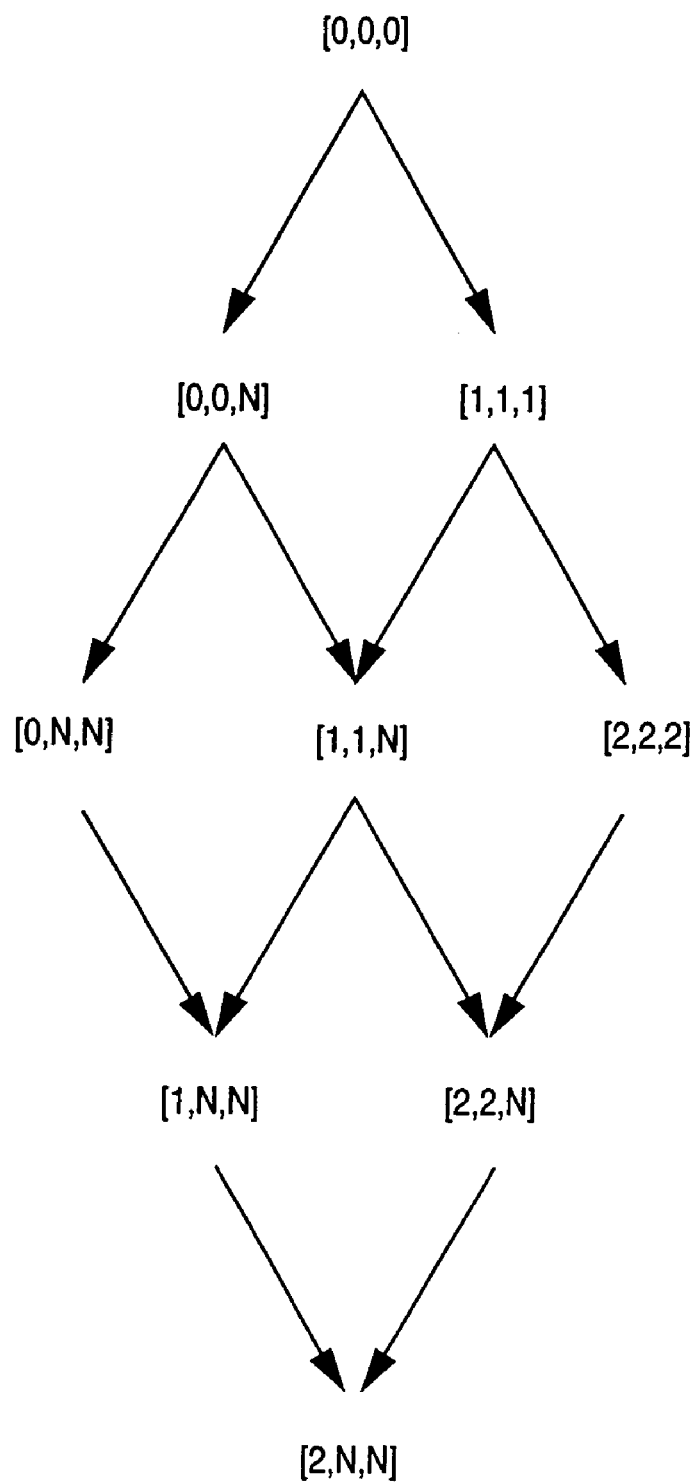
FIG. 3 shows node keys for a directed graph shown in FIG. 2 when a hierarchical key management scheme is applied.
Figure 4:
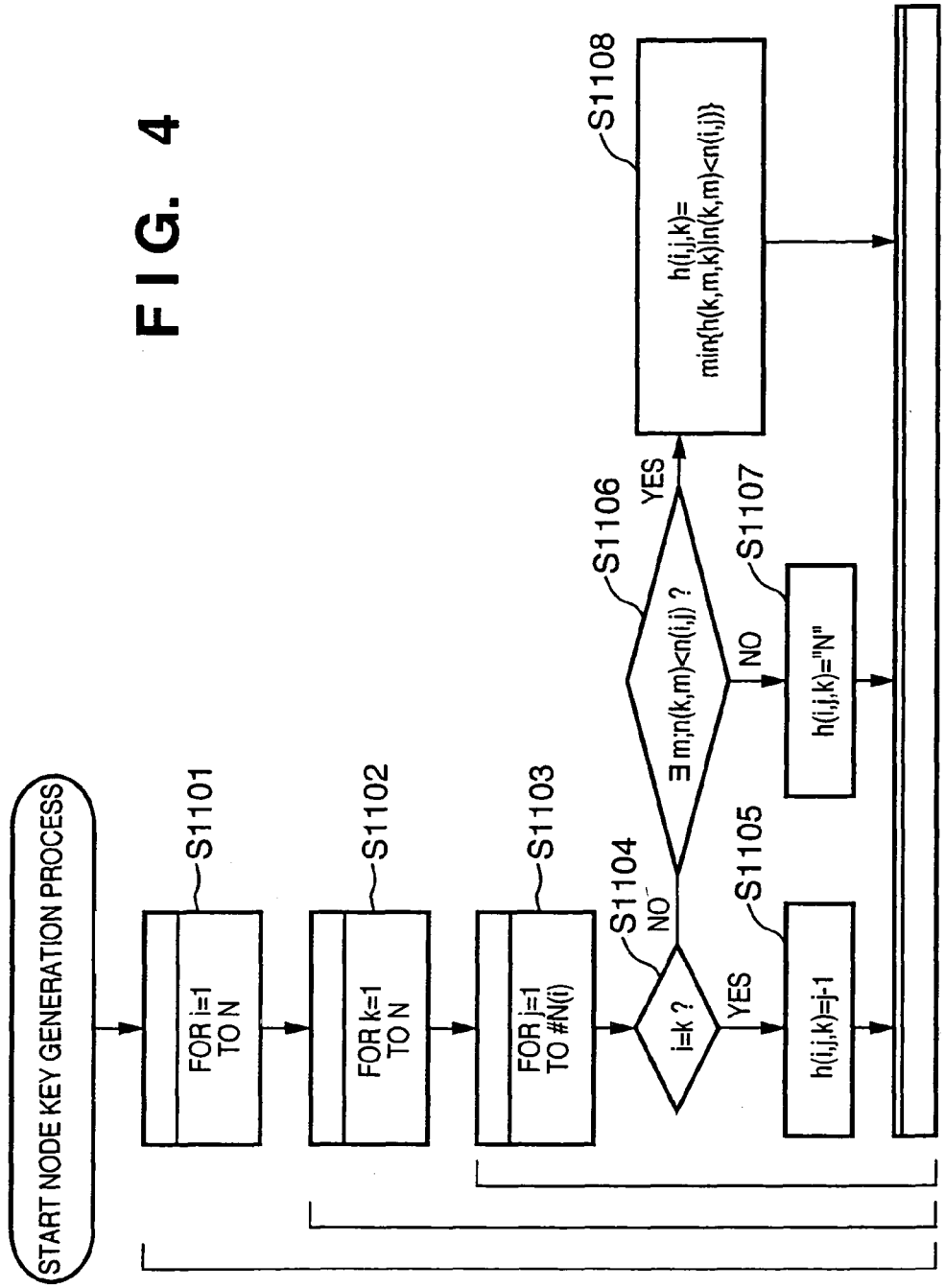
FIG. 4 is a flowchart of a conventional node key assignment process.

FIG. 1 is a block diagram showing the basic arrangement of a computer system which serves as an information processing apparatus according to an embodiment of the present invention. Note that it is not indispensable to use all components shown in FIG. 1 upon executing respective processes to be described later in the system shown in FIG. 1.

This system roughly comprises a host computer main body 100, printer 115, mouse 112, and keyboard 113. Respective devices will be described below.

The host computer 100 generally comprises a computer such as a PC (personal computer), WS (workstation), or the like, and includes units to be described below.

Reference numeral 103 denotes a CPU which controls the overall host computer 100 using programs and data stored in a RAM 105 and ROM 104. Also, the CPU 103 executes a process for receiving instruction inputs from the mouse 112 and keyboard 113, a data communication process with an external device via a network or public line, a print data output process to a printer 115, and respective processes to be described later.

Reference numeral 104 denotes a ROM which stores a boot program, setting data of the host computer 100, and the like.

Reference numeral 105 denotes a RAM which comprises an area for temporarily storing programs and data loaded from an HDD device (hard disk drive device) 106, CD-ROM drive device 108, FD drive device 109, and DVD-ROM drive device 110, and also a work area used by the CPU 103 upon executing respective processes. Note that the load pattern of programs and data onto the RAM 105 is not limited to this. For example, programs and data may be loaded from an external device via an interface 114 and network connection device 107, and the load pattern is not particularly limited.

Reference numeral 106 denotes a hard disk drive device which saves an OS (operating system), and programs and data (e.g., a processing program for key generation, various data (key generation graph and the like) used in the program, and the like) for making the CPU 103 implement respective processes to be described later. Some or all of these programs and data are loaded onto a predetermined area in the RAM 105 under the control of the CPU 103.

Reference numeral 108 denotes a CD-ROM drive device which reads out programs and data recorded on a CD-ROM as a storage medium, and outputs them to the RAM 105 or HDD device 106. Therefore, some of the programs and data saved by the HDD device 106 may be recorded on this CD-ROM, and may be loaded by the CD-ROM drive device 108 onto the RAM 105.

Reference numeral 109 denotes an FD drive device which reads out programs and data recorded on an FD as a storage medium, and outputs them to the RAM 105 or HDD device 106. Therefore, some of the programs and data saved by the HDD device 106 may be recorded on this FD, and may be loaded by the FD drive device 109 onto the RAM 105.

Reference numeral 110 denotes a DVD-ROM drive device which reads out programs and data recorded on a DVD-ROM as a storage medium, and outputs them to the RAM 105 or HDD device 106. Therefore, some of the programs and data saved by the HDD device 106 may be recorded on this DVD-ROM, and may be loaded by the DVD-ROM drive device 110 onto the RAM 105.

Reference numeral 111 denotes an I/F to which the keyboard 113 and mouse 112 can be connected. Therefore, various instruction signals input from the keyboard 113 and mouse 112 are input to the CPU 103 via this I/F 111.

Reference numeral 102 denotes a monitor which comprises a CRT, liquid crystal display, or the like, and can display images, text, and the like, as is well known.

The host computer 100 comprises an I/F 117. The printer 115 is connected to the host computer 100 via the I/F 117. Therefore, when print data generated by the CPU 103 is output to the printer 115 via this I/F 117, a print process can be done in accordance with this print data.

The host computer 100 comprises the network connection device 107 and I/F 114. The host computer 100 can make data communications with an external device via these components. The same applies to a modem 118 and I/F 119 except that a public line is used as a network line.

Reference numeral 116 denotes a bus which interconnects the aforementioned units.

A key generation process to be executed by the computer system with the aforementioned arrangement will be described below. Note that the key generation process to be described below is executed by the CPU 103 using a key generation program and data for key generation (to be described in detail later) which are loaded onto the RAM 105.

<Overview of Key Generation>

An algorithm which calculates a node key assignment table M(G) that represents key generation when node division {SubG_i} ($1 \leq i \leq m$) is given to directed graph G having no cycle uses a multiple digest based key derivation method as the prior art described above. Let $\Gamma:G \rightarrow M(G)$ be this calculation algorithm. M(G) describes node key information for respective nodes, and respective node keys are expressed by m vectors as the size of node division {SubG_i} ($1 \leq i \leq m$).

The given directed graph G is divided, and $\Gamma$ is applied to each divided subgraph G_i to obtain $\Gamma(G\_i)=M(G\_i)$. Division is made to meet the following conditions.

1) Each subgraph has one root node.
2) When the root node of a given subgraph is not the root of the source graph G, the root node of this subgraph is a node of another subgraph.
3) The number of nodes to be shared by another subgraph is one except for a root node.

Note that the key information size can be reduced by reducing the size of a maximum isolated creek in each subgraph upon dividing into subgraphs. Efficiency will be examined below with reference to division of the directed graph shown FIG. 5 which poses a problem in the prior art.

Figure 5:
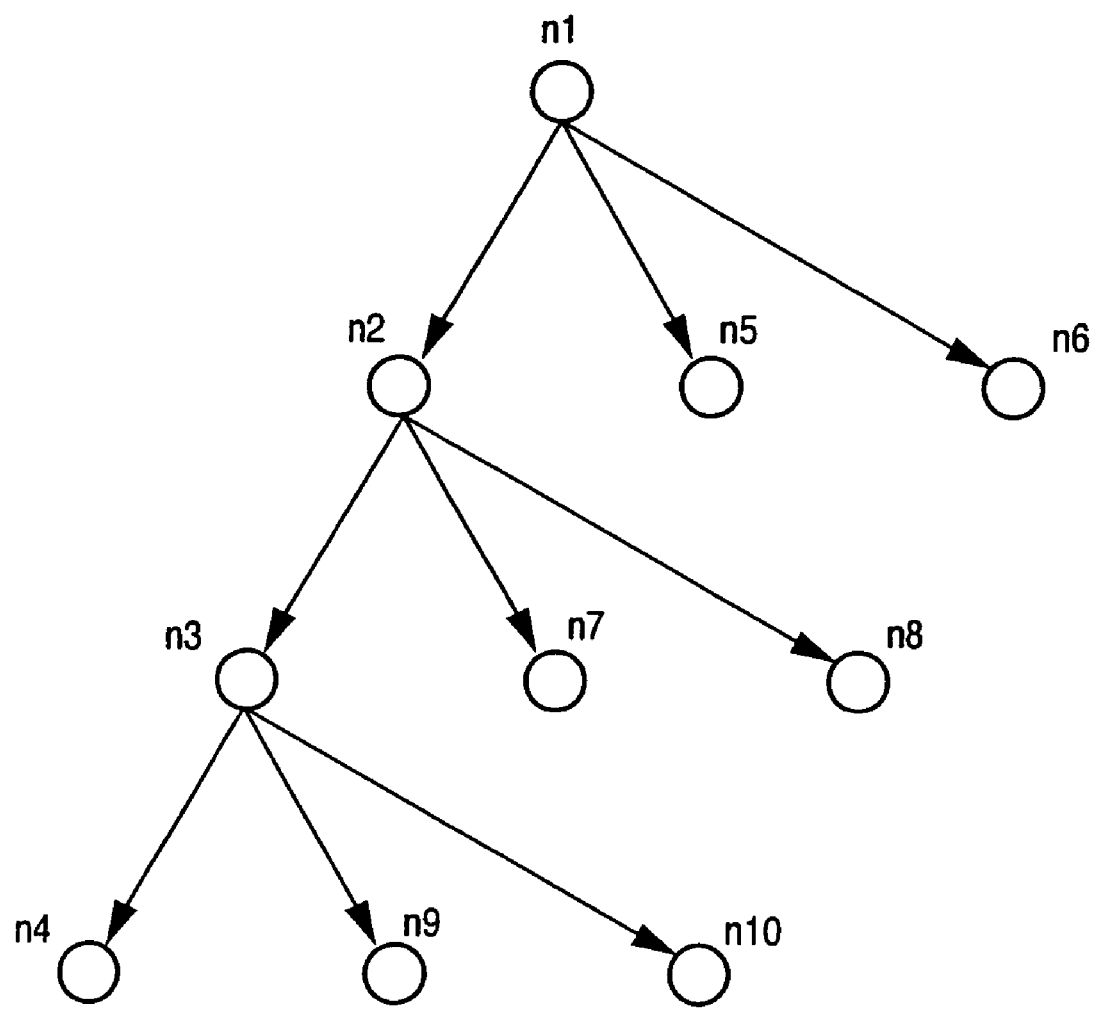
FIG. 5 shows an example of a directed graph in which the maximum value of a node set having no hierarchical relationship matches the size of a node key of a root node.
Figure 7:
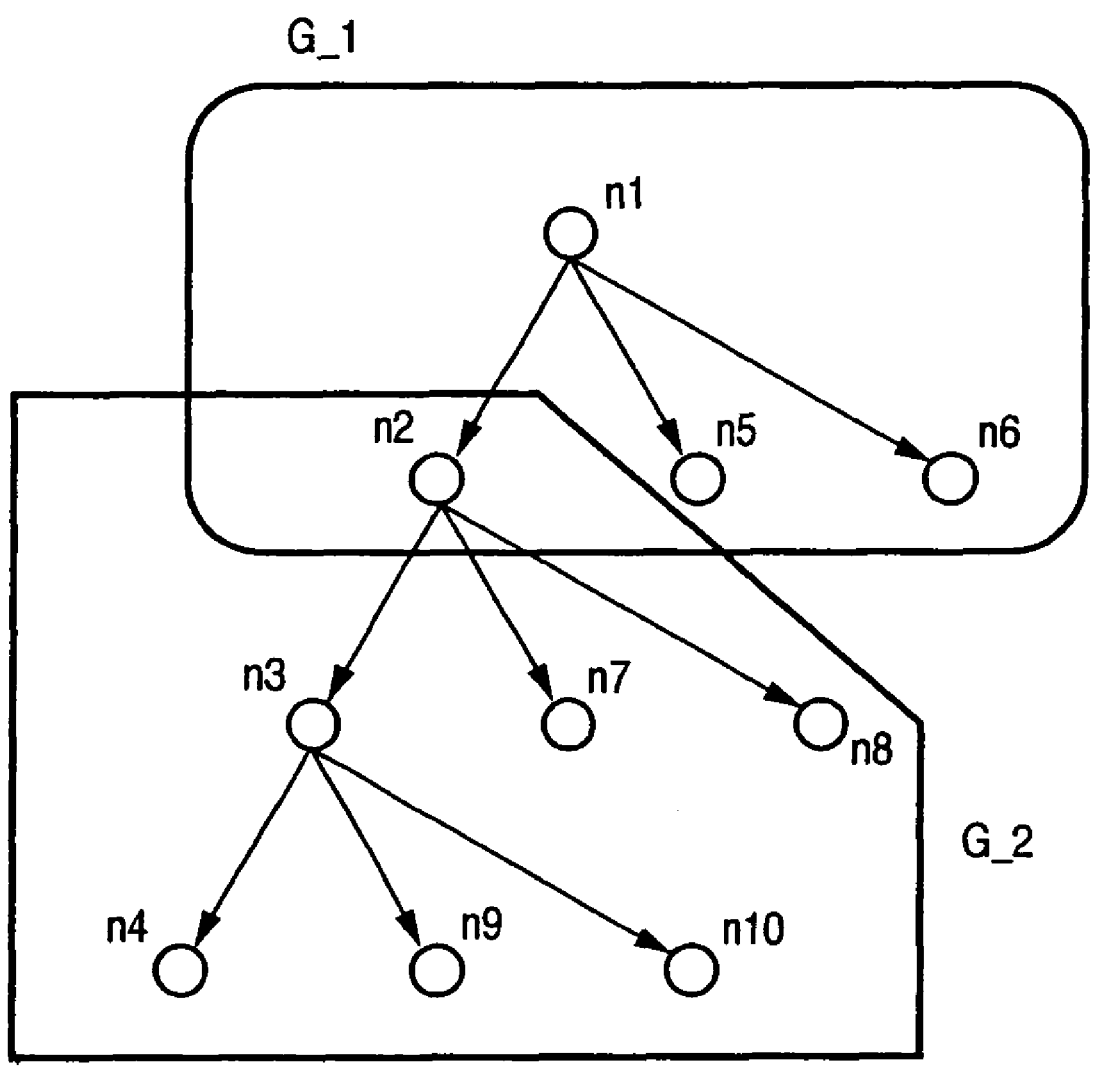
FIG. 7 shows two subgraphs G_1 and G_2.
Figure 8:
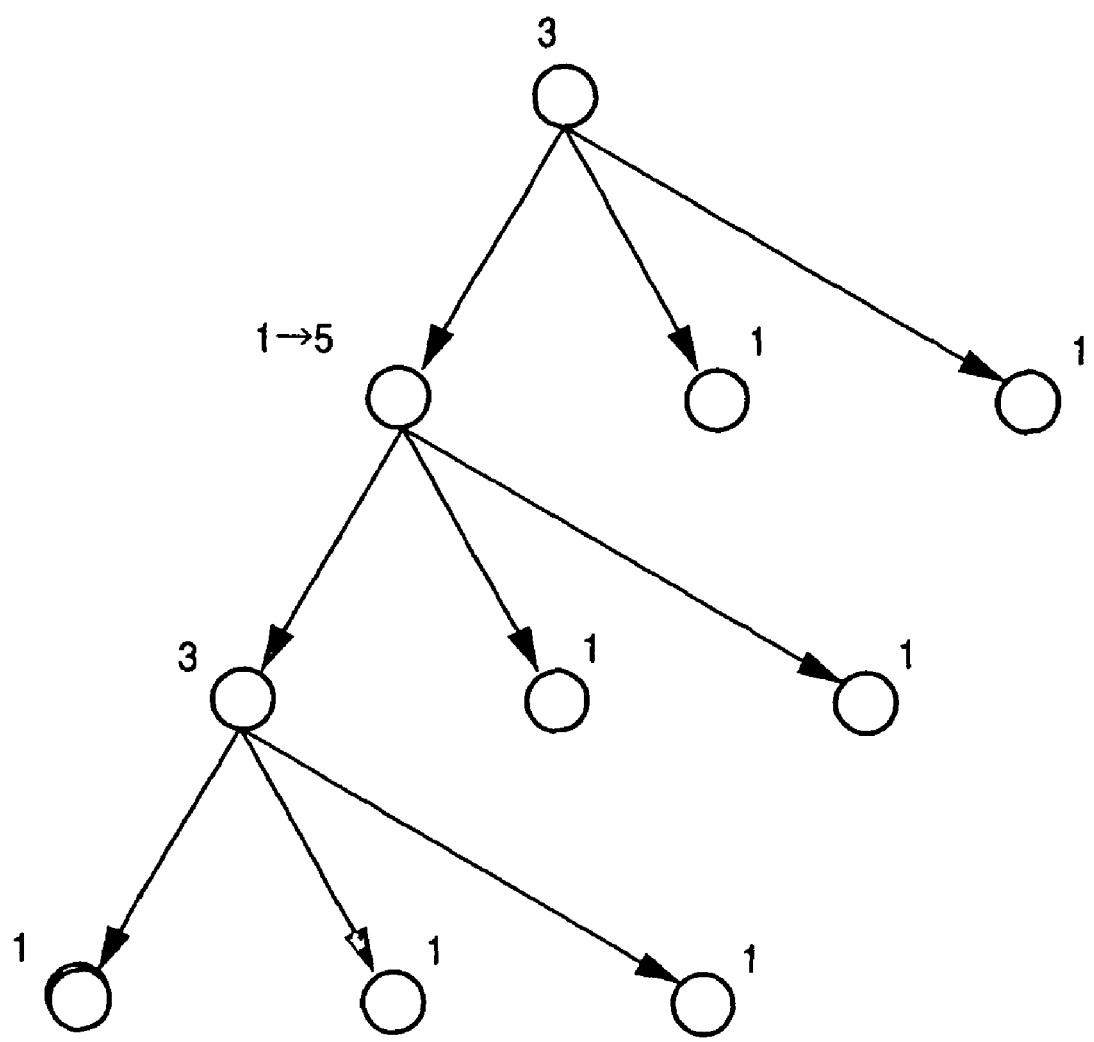
FIG. 8 shows the numbers of pieces of key information when algorithms Γ(G_1) and Γ(G_2) are applied to subgraphs G_1 and G_2.

Let G be the directed graph shown in FIG. 5. FIG. 6 shows the numbers of node keys of respective nodes obtained by algorithm $\Gamma(G)$ at this time. As can be seen from FIG. 6, root node (n_1) requires seven initial keys, and node n_2 requires five pieces of key information. FIG. 8 shows the numbers of pieces of key information when the directed graph is divided into two subgraphs G_1 and G_2 shown in FIG. 7, and algorithms $\Gamma(G\_1)$ and $\Gamma(G\_2)$ are applied to these subgraphs. The number of node keys required for node n_3 is reduced from 5 to 3. As can be seen from a description "1→5" at node n_2, $\Gamma(G\_1)$ requires one key, and $\Gamma(G\_2)$ requires five keys. In this case, this means that five node keys required for $\Gamma(G\_2)$ are generated from key K_1 obtained by $\Gamma(G\_1)$. A scheme for generating five node keys of G_2 from key K_1 assigned to node n_2 by algorithm $\Gamma(G\_1)$ will be described below. In consideration of the hierarchical relationship between G_1 and G_2, it can be understood that the authority associated with key derivation of G_2 is delegated to an entity located at node n_2. For this reason, this means that node keys of G_2 in node n_2 can be freely set, and the following generation scheme can be used as a standard one. Let K_1 be a key assigned to node n_2 by algorithm Γ(G_1), and K2_1, K2_2, K2_3, K2_4, and K2_5 be five node keys derived from K_1. Also, let || be coupling of data, H( ) be a one-way hash function, MAC(K;D) be a message authentication code (MAC) for data D by key K, and r_i be random data disclosed by the system. As the generation scheme of K2_i, for example, following schemes (1) to (9) can be used. For $1 \leq i \leq 5$, node keys are (1) K2_i=H(K_1||i), (2) K2_i=H(K_1||r_i), (3) K2_i=MAC(K_1;i), (4) K2_i=MAC(K_1; r_i), (5) K2_i=MAC(H(K_1||i);i), (6) K2_i=MAC(H(K_1||r_i);r_i), (7) K2_i=H(MAC(K_1);i)||i), (8) K2_i=H(MAC(K_1);r_i)||r_i), and (9) K2_i=H(MAC(K_1);i)||r_i). In this case, if a property that makes it difficult to generate K2_j (i and j are different) from K2_i is provided, the derivation method of five node keys from K2_1 is not particularly limited. Note that an example of five node keys has been explained. However, as can be apparent from the above description, when n (n is a natural number equal to or larger than 2) node keys are to be derived, the same derivation operations can be applied.

Furthermore, as other schemes for deriving n node keys (K2_1, ..., K2_n) from K_1, A) a scheme using a pseudo random number generator, B) a scheme using a plurality of one-way functions, C) a scheme using a public key scheme, and the like are available. These schemes will be described below.

A) Scheme using a pseudo random number generator: A pseudo random number generator PRNG( ) is a function which has seed S as its input and a pseudo random number as its output. Assume that PRNG( ) has the following property: when the same seed is input, the same output is obtained. At this time, using K_1 as a seed, a pseudo random number PRNG(K_1) is output up to a desired bit length (if K2_1 is 1 bit, an output of 1×n bit length is prepared). The output bits are divided bit by bit in turn from the first bit to obtain K2_1, K2_2, ..., K2_n.

B) Scheme using a plurality of one-way functions: n one-way functions F_i( ) are disclosed, and K2_i=F_i(K_1) is calculated (for $1 \leq i \leq n$).

C) Scheme using a public key scheme: n different public keys P_i and encryption functions F_i( ) are disclosed, and K2_i=F_i(P_i; K_1) is calculated (for $1 \leq i \leq n$). Note that the function F_i (P; k) means that K is encrypted using a public key P. As a practical algorithm example, RSA is known. Let (e_i, n_i) be the public key P_i. Then, an encryption function F_i(P_i; M) is equated to M^e_i(mod n_i). At this time, a scheme for independently setting e_i by fixing n_i irrespective of suffix i or vice versa is available.

In this way, as a method of generating n node keys (K2_1, ..., K2_n) from K_1, a method which inhibits K_1 from being generated from any of K2_1, ..., K2_n, and inhibits K2_i from being generated from any of K2_1, ..., K2_n can be used.

Figure 9:
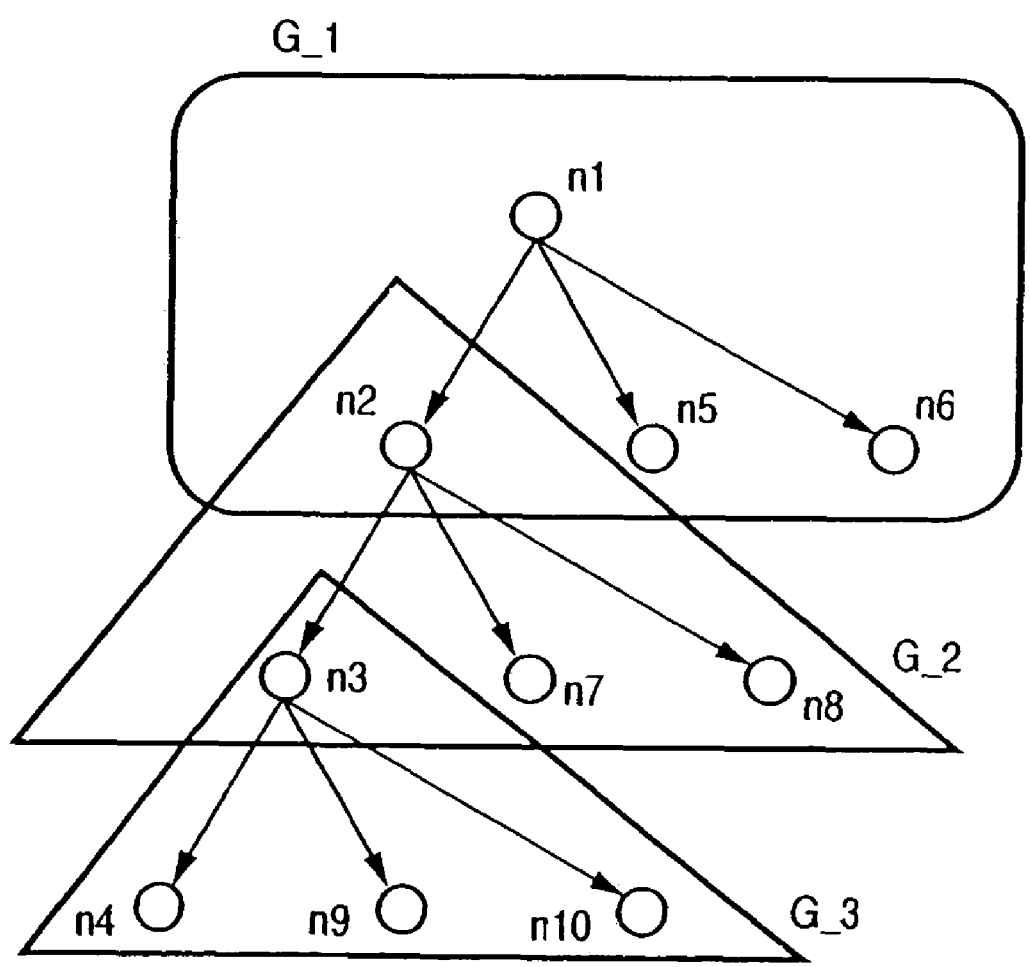
FIG. 9 shows three subgraphs G_1, G_2, and G_3.
Figure 10:
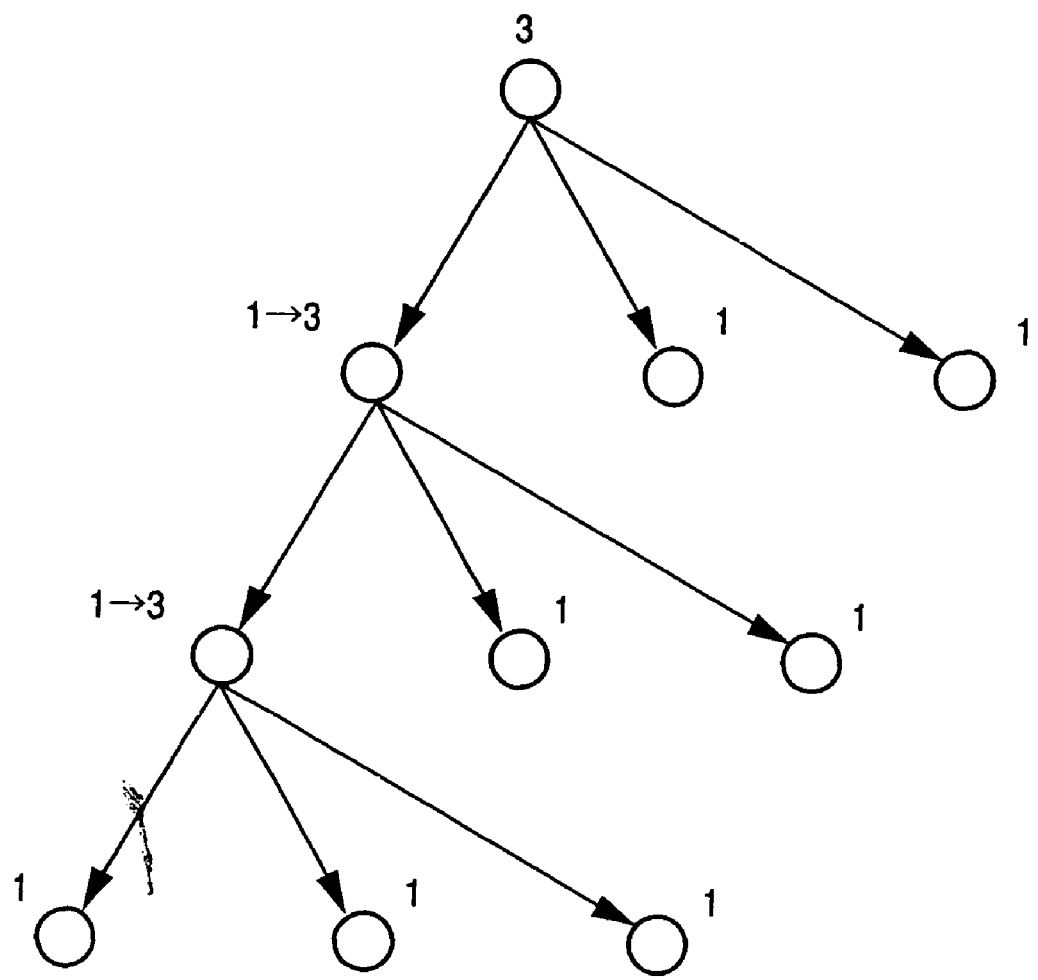
FIG. 10 shows the numbers of keys when a graph is divided into three subgraphs G_1, G_2, and G_3.
Figure 11:
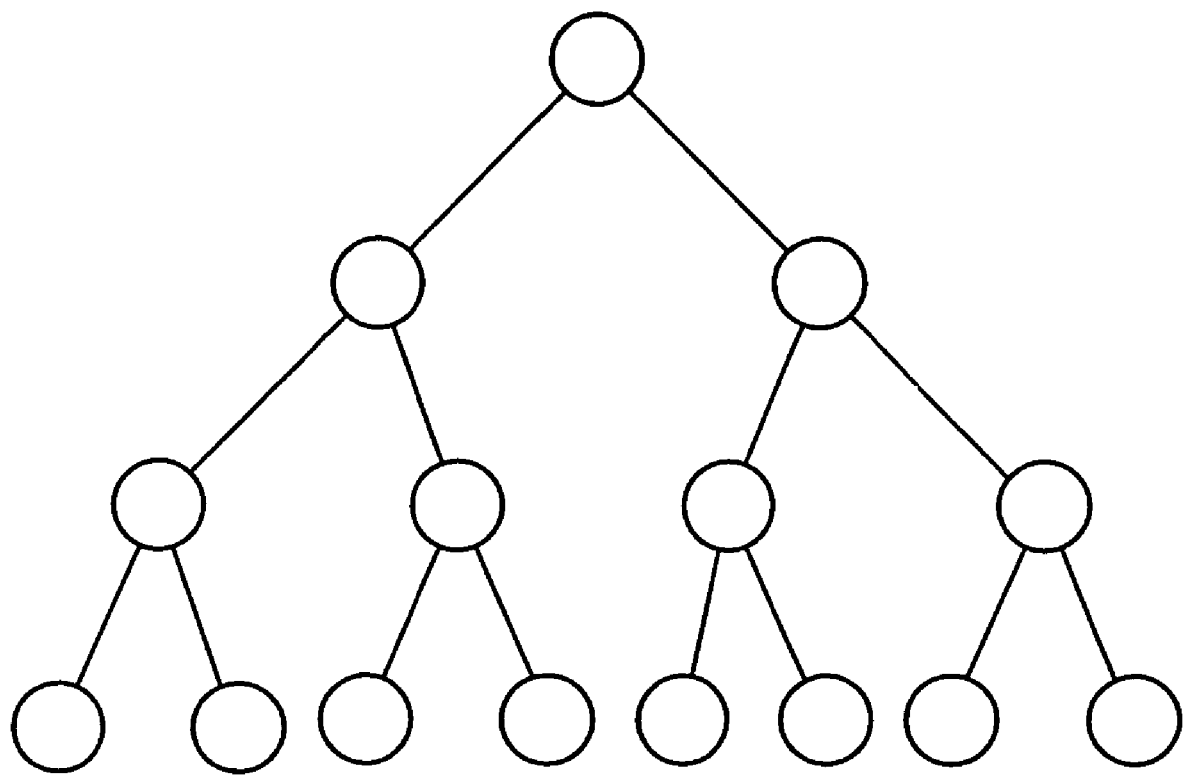
FIG. 11 shows a tree structure for key derivation.
Figure 12:
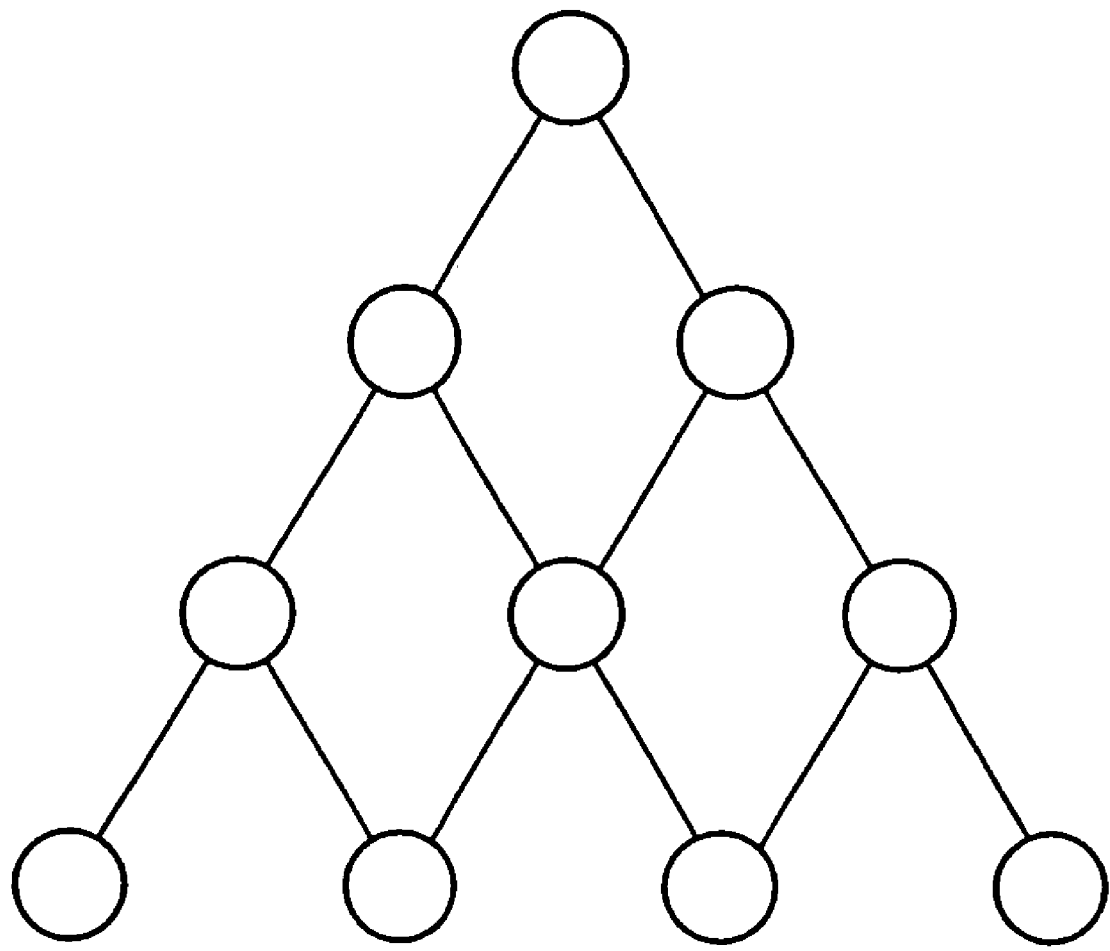
FIG. 12 shows an access structure.
Figure 13:
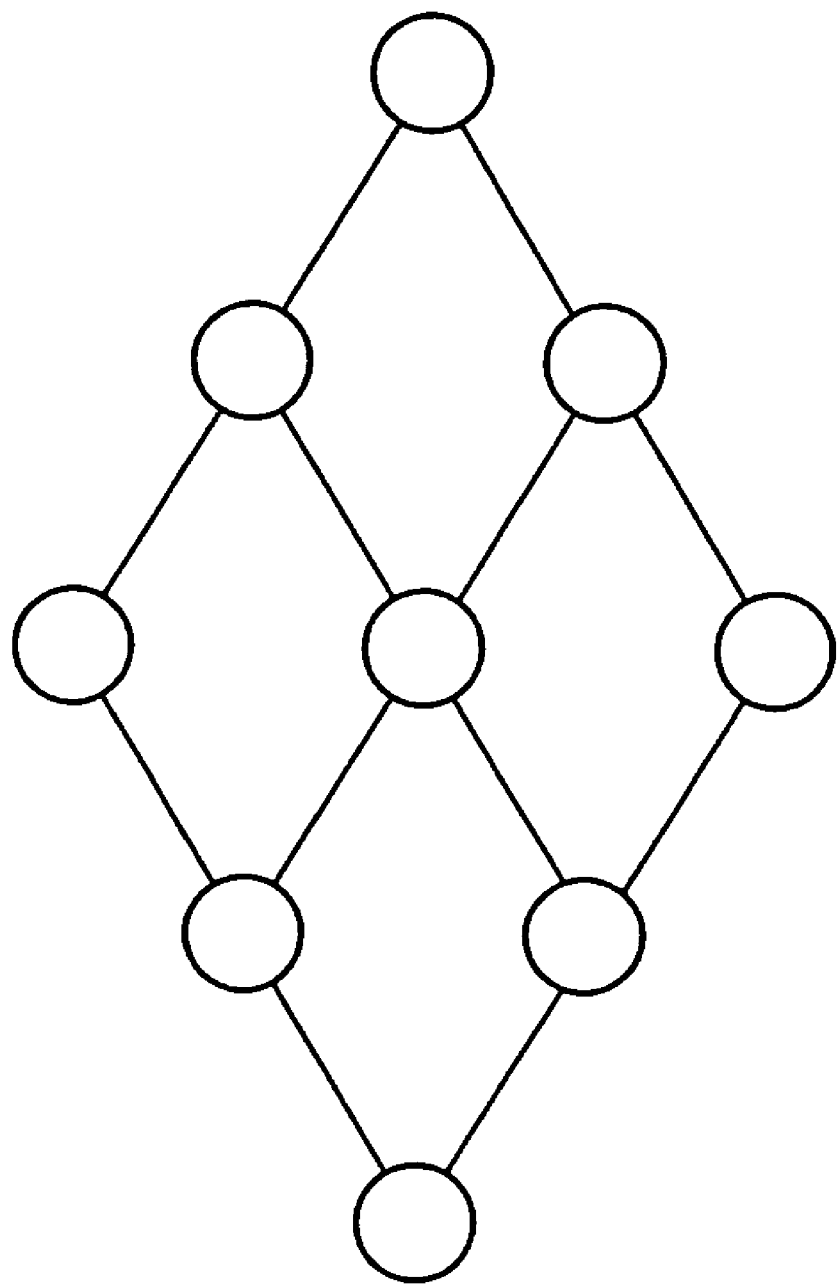
FIG. 13 shows an access structure.
Figure 14:
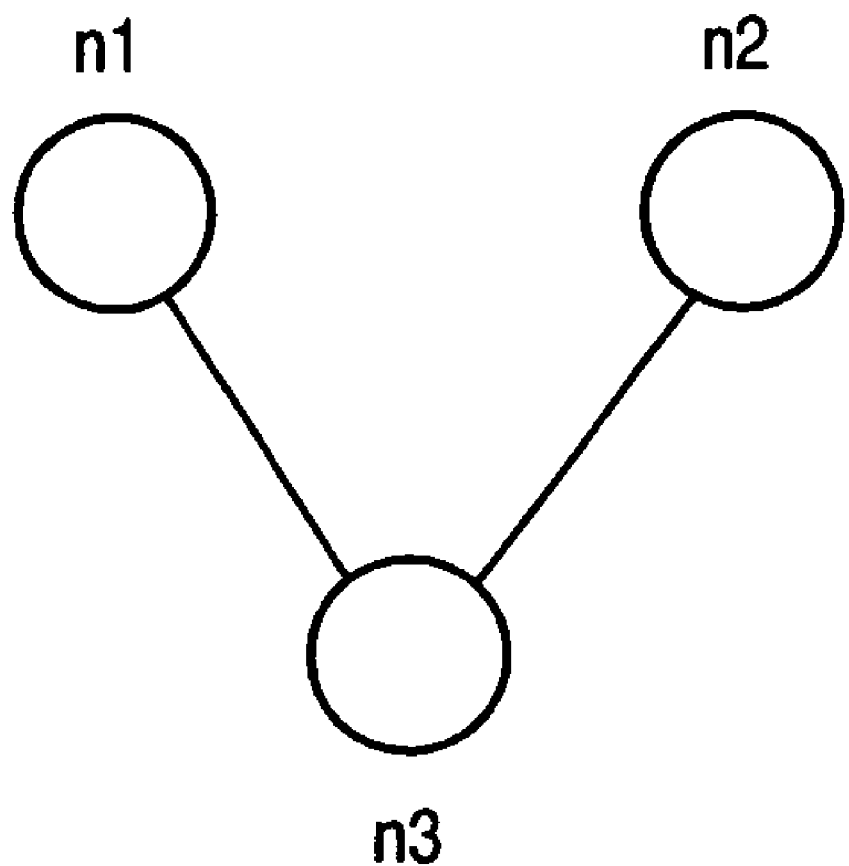
FIG. 14 shows a local structure in the access structure shown in FIG. 12 or 13.
Figure 15:
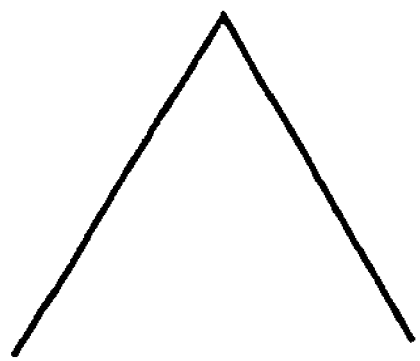
FIG. 15 shows an example of a tree structure in a scheme in which respective nodes hold a plurality of keys.
Figure 15:
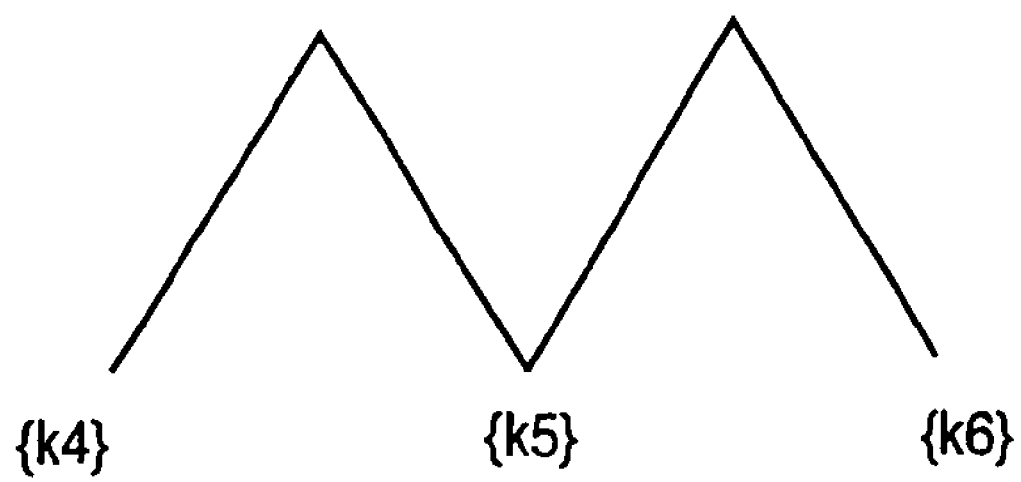
Figure 16:
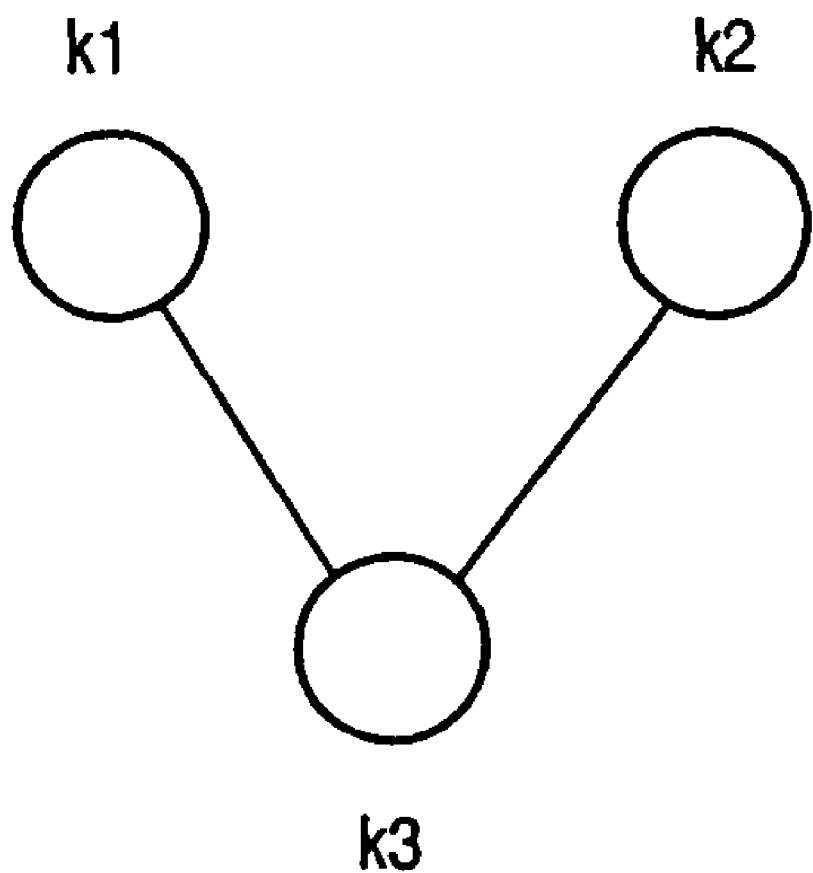
FIG. 16 is a view for explaining a process for generating key data of a child node in One-way function based keying schemes.

When the graph is further divided into three subgraphs G_1, G_2, and G_3, as shown in FIG. 9, the numbers of pieces of key information are changed to those shown in FIG. 10, and can be further reduced.

Figure 17:
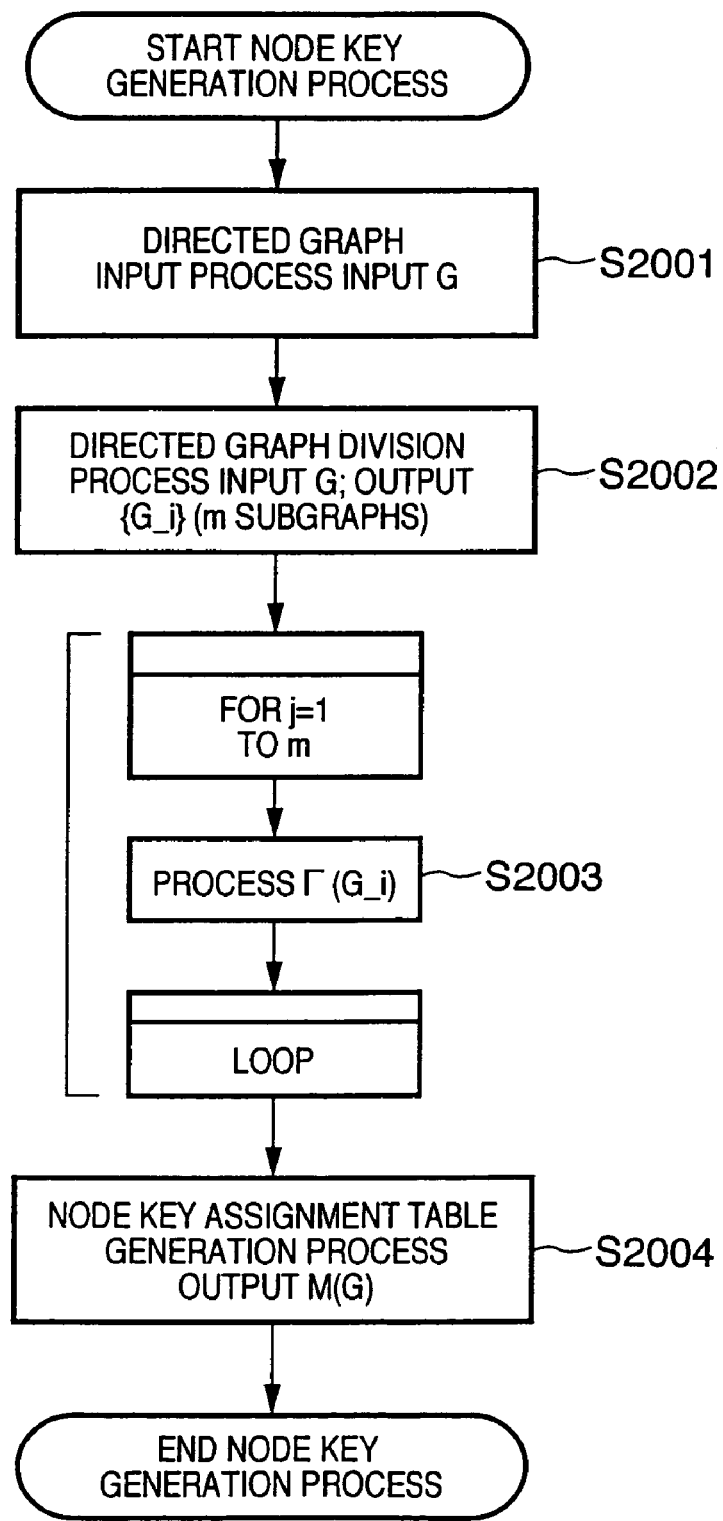
FIG. 17 is a flowchart showing a key generation process according to the embodiment of the present invention.

FIG. 17 is a flowchart showing the key generation process according to this embodiment. In step S2001, data of directed graph G that expresses the access structure is loaded onto the RAM 105. The load pattern is not particularly limited, as described above. For example, the data is loaded from the HDD device 106 onto the RAM in this case.

In step S2002, graph division is made using this data to obtain data of subgraphs {G_i} ($1 \leq i \leq m$). The data of respective divided subgraphs are temporarily stored in a predetermined area in the RAM 105.

In step S2003, algorithm Γ is applied to respective subgraphs G_i obtained to calculate respective node key assignment tables M(G_i). The calculated data of the tables are temporarily stored in a predetermined area in the RAM 105.

Finally, in step S2004 tables M(G_i) are merged (to join the data of the tables for respective subgraphs in the order of i=1, 2, 3, ...) to obtain M(G). M(G) can be expressed in substantially the same manner as in the conventional key node assignment table, except that vector sizes vary for respective subgraphs, and a label used to recognize each node (e.g., n_2 in FIG. 7 or n_2 and n_3 in FIG. 9) that connects upper and lower subgraphs is required.

Also, as the method of generating n node keys (K2_1, ..., K2_n) from K_1, the method described in the example of FIG. 5 can be used.

The embodiment of the present invention has been described. The objects of the present invention are also achieved by supplying a recording medium (or storage medium), which records a program code of a software program that can implement the functions of the above-mentioned embodiments to the system or apparatus, and reading out and executing the program code stored in the recording medium by a computer (or a CPU or MPU) of the system or apparatus. In this case, the program code itself read out from the recording medium implements the functions of the above-mentioned embodiments, and the recording medium which stores the program code constitutes the present invention.

The functions of the above-mentioned embodiments may be implemented not only by executing the readout program code by the computer but also by some or all of actual processing operations executed by an operating system (OS) running on the computer on the basis of an instruction of the program code.

Furthermore, the functions of the above-mentioned embodiments may be implemented by some or all of actual processing operations executed by a CPU or the like arranged in a function extension card or a function extension unit, which is inserted in or connected to the computer, after the program code read out from the recording medium is written in a memory of the extension card or unit.

When the present invention is applied to the recording medium, that recording medium stores program codes corresponding to the aforementioned flowcharts (functional arrangements).

As many apparently widely different embodiments of the present invention can be made without departing from the spirit and scope thereof, it is to be understood that the invention is not limited to the specific embodiments thereof except as defined in the claims.

CLAIM OF PRIORITY

This application claims priority from Japanese Patent Application Nos. 2004-166144 filed on Jun. 3, 2004 and 2005-151614 filed on May 24, 2005, which are hereby incorporated by reference herein.

What is claimed is:

1. An information processing method for generating keys of respective nodes from a parent node on the basis of a hierarchical relationship expressed by a directed graph having no cycles, comprising:

a directed graph input step of inputting data of the directed graph;

a directed graph division processing step of dividing the input data of the directed graph into subgraphs;

a subgraph node key generation step of generating node keys for respective subgraphs divided in the directed graph division processing step; and performing the above steps using at least one processor, wherein the directed graph division processing step is performed so as to satisfy the following three conditions:

1) each subgraph has one root node, 2) when the root node of a given subgraph is not the root of the directed graph, the root node of the given subgraph is a node of another subgraph, and 3) the number of nodes to be shared by another subgraph is one except for a root node, and wherein, in order to generate node keys $K2\_1$-$K2\_n$ for a given subgraph $G2$ from a node key $K\_1$ of a root node of the subgraph $G2$, the subgraph node key generation step is performed according to any one of following three methods:

A) a method of obtaining the $K2\_1$-$K2\_n$ as n random numbers by providing the $K\_1$ as a seed to a pseudo random number generator PRNG ( ), wherein the pseudo random number generator PRNG ( ) generates the n random numbers from the seed $K\_1$, B) a method of obtaining the $K2\_1$-$K2\_n$ by calculating $K2\_i = F\_i(K\_1)$ (for $1 \leq i \leq n$), wherein the $F\_i(\ )$ are n one-way functions, and C) a method of obtaining the $K2\_1$-$K2\_n$ by calculating $K2\_i = F\_i(P\_i; K\_1)$ (for $1 \leq i \leq n$), wherein $P\_1$-$P\_n$ are different public keys and $F\_1(\ )$ - $F\_n(\ )$ are different encryption functions, wherein $F\_i(P\_i; K\_1)$ encrypts the $K\_1$ using $P\_i$ to output the $K2\_i$ as an encryption result.

2. A computer-readable storage medium storing computer-executable instructions which, when executed by a computer, cause the computer to implement an information processing method of claim 1.

3. An information processing apparatus for executing a process for generating keys of respective nodes from a parent node on the basis of a hierarchical relationship expressed by a directed graph having no cycles, comprising:

directed graph input means for inputting data of the directed graph;

directed graph division processing means for dividing the input data of the directed graph into subgraphs; and subgraph node key generation means for generating node keys for respective subgraphs divided by said directed graph division processing means, wherein said directed graph division processing means functions so as to satisfy the following three conditions:

1) each subgraph has one root node, 2) when the root node of a given subgraph is not the root of the directed graph, the root node of the given subgraph is a node of another subgraph, and 3) the number of nodes to be shared by another subgraph is one except for a root node, and wherein, in order to generate node keys $K2\_1$-$K2\_n$ for a given subgraph $G2$ from a node key $K\_1$ of a root node of the subgraph $G2$, said subgraph node key generation means functions according to any one of following three methods:

A) a method of obtaining the $K2\_1$-$K2\_n$ as n random numbers by providing the $K\_1$ as a seed to a pseudo random number generator PRNG ( ), wherein the pseudo random number generator PRNG ( ) generates the n random numbers from the seed $K\_1$, B) a method of obtaining the $K2\_1$ - $K2\_n$ by calculating $K2\_i = F\_i(K\_1)$ (for $1 \leq i \leq n$), wherein the $F\_i(\ )$ are n one-way functions, and C) a method of obtaining the $K2\_1$-$K2\_n$ by calculating $K2\_i = F\_i(P\_i; K\_1)$ (for $1 \leq i \leq n$) wherein $P\_1$-$P\_n$ are different public keys and $F\_1(\ )$ - $F\_n(\ )$ are different encryption functions, wherein $F\_i(P\_i; K\_1)$ encrypts the $K\_1$ using $P\_i$ to output the $K2\_i$ as an encryption result.

* * * * *